United States Patent [19]

Ishiura et al.

[11] Patent Number: 5,430,095

[45] Date of Patent: Jul. 4, 1995

[54] RUBBER COMPOSITION CONTAINING A TERMINALLY-FUNCTIONALIZED LOW MOLECULAR WEIGHT DIENE POLYMER

[75] Inventors: Kazushige Ishiura; Hideo Takamatsu; Tsutomu Yamada; Atsuhisa Ogawa, all of Ibaraki, Japan

[73] Assignee: Kuraray Company, Ltd., Kurashiki, Japan

[21] Appl. No.: 115,037

[22] Filed: Sep. 1, 1993

[30] Foreign Application Priority Data

Sep. 18, 1992 [JP] Japan .................. 4-275105

[51] Int. Cl.[6] .................. C08L 13/00; C08L 7/00; C08L 9/06; C08K 3/04
[52] U.S. Cl. .................. 524/571; 524/495; 524/526; 524/572; 524/575; 524/575.5; 525/232
[58] Field of Search ............. 524/496, 847, 572, 575, 524/515, 525, 526, 495, 496, 575.5, 571; 525/383, 331.9, 332.9, 911, 376

[56] References Cited

U.S. PATENT DOCUMENTS

| | | | |
|---|---|---|---|
| 3,108,994 | 10/1963 | Zelinski | 525/383 |
| 3,135,716 | 6/1964 | Urameck | 525/383 |
| 3,242,129 | 3/1966 | Wilder | 525/383 |
| 3,308,170 | 3/1967 | Pritchett et al. | 525/383 |
| 3,941,740 | 3/1976 | Barbin et al. | 524/871 |
| 4,398,582 | 8/1983 | Yuto et al. | 524/496 |
| 4,585,826 | 4/1986 | Graves | 524/496 |
| 4,835,209 | 5/1989 | Kitagawa et al. | 524/507 |
| 4,866,131 | 9/1989 | Fujimaki et al. | 525/96 |
| 5,077,346 | 12/1991 | Dias et al. | 525/383 |
| 5,248,722 | 9/1993 | De Trano et al. | 524/496 |

FOREIGN PATENT DOCUMENTS 0178752 4/1986 European Pat. Off. .
219201 2/1985 Germany .

OTHER PUBLICATIONS

Database WPI, Derwent Publications, AN 75–09956W, JP-A-49115137, Nov. 2, 1974.

*Primary Examiner*—James J. Seidleck
*Assistant Examiner*—Mark L. Warzel
*Attorney, Agent, or Firm*—Oblon, Spivak, McClelland, Maier & Neustadt

[57] ABSTRACT

A rubber composition having excellent processability and improved dispersion state of carbon black containing:

a functional group-containing polymer having a number average molecular weight of 1,000 to 100,000 and comprising 0 to 60 mole % of a structural unit represented by the formula (1) and 100 to 40 mole % of a structural unit represented by formula (2) plus a structural unit represented by formula (3), the polymer having on one end of its molecule an average at least 0.6 group per molecule of a group represented by formula (4), a hydroxyl group or an amino group;

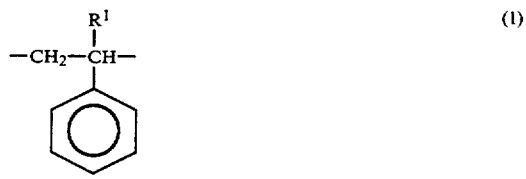

(1)

wherein $R^1$ represents a hydrogen atom or a methyl group,

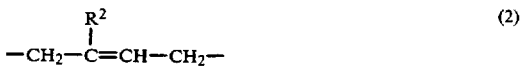 (2)

wherein $R^2$ represents a hydrogen atom or a methyl group,

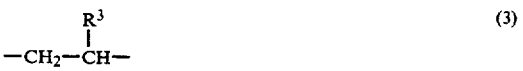 (3)

wherein $R^3$ represents a vinyl group or an isopropenyl group;

$$-COOR^4 \qquad (4)$$

wherein $R^4$ represents a hydrogen atom or an alkali metal;
a solid rubber and
carbon black.

3 Claims, No Drawings

RUBBER COMPOSITION CONTAINING A TERMINALLY-FUNCTIONALIZED LOW MOLECULAR WEIGHT DIENE POLYMER

BACKGROUND OF THE INVENTION

1. Field of the Invention

The present invention relates to a rubber composition having excellent processability and improved dispersion for carbon black.

2. Description of the Prior Art

In recent years, with trends towards higher performance of automobiles, requirements with respect to safety, high-speed performance, fuel consumption and the like are becoming more and more severe.

To satisfy these requirements from the position of carbon black to be added to solid rubber to reinforce it, thereby obtaining a tire having both good gripping property and anti-wet-skid property while maintaining good wear resistance that can withstand high-speed stable running, it is reportedly effective to decrease the primary particle diameter and increase the specific surface area of carbon black.

However, too small a primary particle diameter of carbon black decreases the processability so that incorporation of the carbon black into rubber becomes difficult. Forced dispersion of such carbon black in rubber by for example prolonged kneading time still cannot satisfy the property requirements due to decreased dispersibility.

Use of additives to improve dispersibility of carbon black has been attempted. For example, Japanese Patent Application Laid-open No. 20579/1992 proposes addition as a dispersing agent for carbon black of an ester of an unsaturated aliphatic acid having 8–24 carbon atoms or that of an unsaturated alcohol having 8–24 carbon atoms. However, these additives, having small molecular weights, have the drawback of decreasing the mechanical strength of the resulting rubber compositions.

Journal of Japan Rheology Association, Vol. 20, 18 (1992) describes that polymers having terminal carboxyl group are effective for dispersing pigments. The polymers with terminal carboxyl group, their main chain being a polyester (polycaprolactone), have the drawback of very poor compatibility when used as a dispersing agent for carbon black for rubber, thereby being inferior in processability and decreasing mechanical properties, as shown in Comparative Example 5 to be described later herein.

Japanese Patent Application Laid-open Nos. 105844/1974 and 89446/1975 describe a processing of a conjugated diene-based low-molecular-weight polymer comprising incorporating carbon black into the conjugated diene-based low-molecular-weight polymer having at least one functional group. In this process, the functional group possessed by the conjugated diene-based low-molecular-weight polymer has been introduced thereinto to act as a crosslinking point when this polymer is to be cured by crosslinking. Thus, these literature have no technical thought of improving the dispersibility of carbon black by the use of a conjugated diene-based low-molecular-weight polymer having functional group.

Japanese Patent Application Laid-open No. 124639/1985 discloses a composition having good adhesion obtained by adding to a solid rubber a diene-based liquid rubber having at least 3 hydroxyl groups in the molecule thereof. On this occasion, there is employed a process for producing the diene-based liquid rubber having hydroxyl groups which comprises introducing maleic anhydride into a diene-based liquid rubber and then reacting the modified liquid rubber with an amino alcohol to introduce hydroxyl groups. This process, however, permits maleic anhydride to bond uniformly to the middle part and both ends of the diene-based liquid rubber, thereby being unable to control the bonding positions for hydroxyl groups in the main chain of the diene-based liquid rubber. Besides, the literature mentions nothing about the effect of improving dispersion of carbon black as produced by addition of the diene-based liquid rubber having hydroxyl groups.

Japanese Patent Application Laid-open Nos. 127952/1977, 51146/1983 and 61135/1983 describe that rubber compositions obtained by adding a functional group-containing polymer to a solid rubber is effective in improving adhesion with materials of different nature. However, any one of the rubber compositions must contain as an essential component an organometal compound. Besides, none of the literature mentions improvement by the functional group-containing polymer in dispersibility of carbon black.

Japanese Patent Application Laid-open No. 133436/1980 describes that a rubber composition was obtained by adding to a vulcanized rubber powder a liquid polyisoprene rubber modified by addition reaction of maleic anhydride or its derivatives. In this composition, however, the modified liquid polyisoprene rubber is to act as a binder and carbon black is not an essential component.

SUMMARY OF THE INVENTION

Accordingly, an object of the present invention is to provide a rubber composition having excellent processability and improved dispersion for carbon black.

The present inventor has found, to complete the invention, that the above object can be achieved by providing a rubber composition comprising:

a functional group-containing polymer having a number average molecular weight of 1,000 to 100,000 and comprising 0 to 60 mole % of a structural unit represented by the formula (1) and 100 to 40 mole % of a structural unit represented by formula (2) plus a structural unit represented by formula (3), said polymer having on one end of its molecule an average at least 0.6 group per molecule of a group represented by formula (4), a hydroxyl group or an amino group;

wherein R¹ represents a hydrogen atom or a methyl group,

wherein R² represents a hydrogen atom or a methyl group,

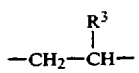

wherein $R^3$ represents a vinyl group or an isopropenyl group;

$$-COOR^4 \quad (4)$$

wherein $R^4$ represents a hydrogen atom or an alkali metal;
a solid rubber and
carbon black.

DETAILED DESCRIPTION OF THE PREFERRED EMBODIMENTS

The structural units constituting the basic skeleton of the functional group-containing polymer used in the present invention are shown by the above formulas (1), (2) and (3). The basic skeleton thus comprises a copolymer of for example styrene, α-methylstyrene, butadiene, isoprene and the like. For example, the structural unit of formula (1) with the $R^1$ being a hydrogen atom is styrene and that with $R^1$ being a methyl group is α-methylstyrene; the structural unit of formula (2) with the $R^2$ being a hydrogen atom and that of formula (3) with the $R^3$ being a vinyl group both correspond to butadiene; and the structural unit of formula (2) with $R^2$ being a methyl group and that of formula (3) with $R^3$ being an isopropenyl group both correspond to isoprene. The functional group-containing polymer may comprise all of the structural units represented by formulas (1), (2) and (3) and in this case these units may be arranged in any optional sequence in the polymer.

It is necessary that in the functional group-containing polymer used in this invention the content of the structural unit of formula (1) do not exceed 60 mole %. If the content exceeds 60 mole %, the resulting functional group-containing polymer will have poor compatibility with solid rubbers so that dispersibility of carbon black is not improved.

The functional group-containing polymer have on one end of its molecule a group represented by formula (4), a hydroxyl group or an amino group. In the formula (4), an $R^4$ of a lithium atom makes the group COOLi, while one of a hydrogen atom makes COOH.

It is necessary that the functional group-containing polymer have an average of at least 0.6 group per molecule of the group represented by formula (4), a hydroxyl group or an amino group. If the content of such group is less than 0.6 group per molecule, the functional group-containing polymer will have insufficient affinity with carbon black so that carbon black cannot sufficiently disperse in rubber.

It is necessary that the functional group-containing polymer have a molecular weight in a range of 1,000 to 100,000. If the molecular weight is less than 1,000, the resulting rubber composition have poor mechanical properties. On the other hand, if the molecular weight exceeds 100,000, the polymer will have insufficient effect of improving the processability of rubber composition.

In the present invention, the functional group-containing polymer is generally added in an amount of 1 to 40% by weight based on the weights of the functional group-containing polymer and the solid rubber used.

If the addition of the functional group-containing polymer is less than 1% by weight, there sometimes cannot be achieved sufficient improvement in the processability upon obtaining rubber compositions and dispersibility of carbon black in the resulting rubber compositions. If the addition of the functional group-containing polymer exceeds 40% by weight, the resulting rubber composition will sometimes have poor mechanical properties.

The functional group-containing polymer can be obtained by the following process.

For example, a copolymer of an aromatic vinyl compound and a conjugated diene and having COOLi on one end of its molecule is obtained as follows. An aromatic vinyl monomer and a conjugated diene monomer is subjected to anionic polymerization with an initiator of butyl lithium, to yield a living polymer. The active terminal of the polymer is treated with carbon dioxide to obtain the desired polymer having COOLi on one end of its molecule.

As another example, a copolymer of an aromatic vinyl compound and a conjugated diene and having COOH on one end of its molecule can be obtained by producing by the above process the above copolymer of an aromatic vinyl monomer and a conjugated diene monomer and having COOLi on one end of its molecule and then wash the copolymer with an acid or the like to convert COOLi to COOH.

A copolymer of an aromatic vinyl compound and a conjugated diene and having OH on one end of its molecule is obtained, for example, by conducting anionic polymerization of an aromatic vinyl monomer and a conjugated diene monomer with an initiator of butyl lithium to obtain a living polymer and then reacting the polymerizable active terminal of the obtained polymer with ethylene oxide, propylene oxide or the like.

Further a copolymer of an aromatic vinyl compound and a conjugated diene and having $NH_2$ on one of its molecule is obtained by, for example, reacting with hydrazine the copolymer of an aromatic vinyl compound and a conjugated diene and having COOH on one end of its molecule obtained above.

Examples of solid rubbers usable in the present invention are natural rubber (NR), isoprene rubber (IR), butadiene rubber (BR), styrene-butadiene rubber (SBR) and ethylene-propylene-diene rubber (EPDM).

Although there are in the strict sense no restrictions with respect to the carbon black used in the present invention, the smaller the particles the higher the effect. It is therefore desirable to use HAF, ISAF or, further, SAF which is a microfine powder.

The rubber composition of the present invention is obtained by kneading the functional group-containing polymer, a solid rubber and carbon black in a roll mixer, kneader, Bambary mixer or like mixers. With respect to the order of addition, there are available a process comprising kneading a solid rubber with a functional group-containing polymer and then adding carbon black; a process comprising adding the functional group-containing polymer to carbon black and adding the mixture to a solid rubber, and like processes.

The rubber composition of the present invention may, as required, incorporate fillers such as clay and calcium carbonate, extenders, flame retardants, plasticizers, antioxidants and the like.

According to the present invention there are provided rubber compositions having excellent processability for their preparation and improved dispersion for carbon black. The rubber compositions, with their carbon black component having improved dispersibility, give, after being cured, tires provided with good gripping property and resistance to wet skid and maintaining good wear resistance.

EXAMPLES

Other features of the invention will become apparent in the course of the following descriptions of exemplary embodiments which are given for illustration of the invention and are not intended to be limiting thereof.

Reference Example 1

[Synthesis of a functional group-containing polymer (I)]

Isoprene monomer was polymerized in n-hexane with an initiator of n-butyl lithium to yield a living polymer. To the polymerizable active terminal of the polymer 10 molar equivalents of carbon dioxide was added to obtain a polyisoprene (I) having COOLi on one end of the molecular chain thereof.

The polymer thus obtained was treated with hydrochloric acid to convert COOLi to COOH. From the acid value determined on this polymer and the molecular weight (Mn) obtained with an osmometer being 20,000, it was found that the polyisoprene (I) had 0.93 piece of COOLi per molecule. NMR spectrometry revealed that the structural unit of formula (2) ($R^2$ is a methyl group) was contained in an amount of 91 mole % and that of formula (3) ($R^3$ is an isopropenyl group) in an amount of 9 mole %.

Reference Example 2

[Synthesis of functional group-containing polymer (II)]

The polyisoprene (I) having COOLi on one end of the molecular chain thereof obtained in Reference Example 1 was washed with hydrochloric acid to yield a polyisoprene (II) having COOH on one end thereof.

Reference Example 3

[Synthesis of a functional group-containing polymer (III)]

Isoprene monomer was polymerized in hexane with an initiator of n-butyl lithium to yield a living polymer. To the polymerizable active terminal of the polymer 10 molar equivalents of ethylene oxide was added to obtain a polyisoprene (III) having OH on one end of the molecular chain thereof.

From the hydroxyl group value obtained by acetylation method and the molecular weight (Mn) obtained with an osmometer being 20,000, it was found that the polyisoprene (III) had 0.87 piece of hydroxyl group per molecule. NMR spectrometry revealed that the structural unit of formula (2) ($R^2$ is a methyl group) was contained in an amount of 90 mole % and that of formula (3) ($R^3$ is an isopropenyl group) in an amount of 10 mole %.

Reference Example 4

[Synthesis of a functional group-containing polymer (IV)]

A mixture of styrene monomer and butadiene monomer was polymerized in cyclohexane with an initiator of n-butyl lithium to yield a styrene-butadiene random copolymer. To the polymerizable active terminal of the copolymer 10 molar equivalents of ethylene oxide was added to obtain a styrene-butadiene random copolymer (VI) having hydroxyl group on one end of the molecular chain thereof.

From analysis with an osmometer the Mn was found to be 40,000. The ratio of styrene/butadiene obtained both from feeding ratio and by NMR spectrometry was 25/75 (moles/moles).

From the hydroxyl group value obtained by acetylation method and the molecular weight (40,000), it was found that the functional group-containing polymer (IV) had 0.85 piece of hydroxyl group per molecule. NMR spectrometry revealed that the structural unit of formula (1) ($R^1$ is a hydrogen atom) was contained in an amount of 25 mole %, that of formula (2) ($R^2$ is a hydrogen atom) in an amount of 67% and that of formula (3) ($R^3$ is a vinyl group) in an amount of 8 mole %.

Reference Example 5

[Synthesis of functional group-containing polymer (V)]

The polyisoprene (II) having COOH on one end thereof synthesized in Reference Example 2 was dissolved in toluene and reacted with 100 molar equivalents of hydrazine based on the moles of the terminal COOH, to yield a polyisoprene (V) having $NH_2$ one one end of the molecule thereof.

Conversion of COOH to $NH_2$ was verified by infrared absorption spectrometry.

Reference Example 6

[Synthesis of liquid polyisoprene (I)]

Isoprene monomer was subjected to anionic polymerization in n-hexane with an initiator of n-butyl lithium, to yield liquid polyisoprene (I).

The molecular weight (Mn) obtained with an osmometer was 20,000. NMR spectrometry revealed that the structural unit of formula (2) ($R^2$ is a methyl group) was contained in an amount of 89 mole % and that of formula (3) ($R^3$ is an isopropenyl group) in an amount of 11 mole %.

Reference Example 7

[Synthesis of unsaturated aliphatic ester (I) ]

Oleic acid [$CH_3(CH_2)_7CH=(CH_2)_7COOH$] and ethylene glycol ($HOCH_2CH_2OH$) were reacted in equimolar amounts to give an ester (I) of oleic acid and ethylene glycol.

Reference Example 8

[Polyester (I) having terminal carboxyl group]

Ring-opening polymerization of ε-caprolactone was conducted with an initiator of glycolic acid, to obtain a polyester (I) having terminal carboxyl group and having a molecular weight of 3,000.

Reference Example 9

[Synthesis of liquid polyisoprene (II)]

According to the procedure given in the specification of Japanese Patent Application Laid-open No. 133436/1980, maleic anhydride was added to a liquid polyisoprene having a molecular weight of 45,000, and to the mixture methanol was added, to obtain a liquid polyisoprene (II) having an average 5 maleic anhydride monomethyl ester groups added per molecule.

Reference Example 10

[Synthesis of liquid polyisoprene (III)]

According to the procedure given in the specification of Japanese Patent Application Laid-open No. 124639/1985, maleic anhydride was added to a liquid polyisoprene having a molecular weight of 45,000, and to the mixture amino alcohol was added, to obtain a liquid polyisoprene (III) having an average 3 hydroxyl groups added per molecule.

Examples 1 through 5 and Comparative Examples 1 through 7

The polymers synthesized in Reference Examples, NR and SBR as solid rubbers, SAF as carbon black and other additives in formulations as shown in Table 1 were fed to an 8-inch roll and the compositions were kneaded at 50° C. for 10 minutes.

The state of incorporation of carbon black was checked by visual observation for every composition after kneading and the results are summarized in Table 1. The state of incorporation was expressed in the ratings of ⊙, ○, Δ and X which mean "excellent", "good", "marginal" and "bad", respectively. The rubber compositions obtained were tested for Mooney viscosity, which was used for indicating processability. That is, reduction in Mooney viscosity is judged to be due to plasticization and hence lower values were evaluated as better processability.

The state of dispersion of carbon black in each of the rubber compositions was observed under an optical microscope and the results of the observation were summarized in Table 1. The numbers of aggregates of carbon black were expressed in the ratings of A, B, C and D, in the order of from smaller to larger; and the diameters of the aggregates were expressed in 1, 2, 3 and 4 in the order of from smaller to larger. A good dispersion may therefore be A-1, while bad one D-4.

The rubber compositions were further vulcanized to form sheets, the properties of which were measured and summarized in Table 1.

From Table 1, it is understood that with compositions comprising the functional group-containing polymers (I) through (V) the state of dispersion of carbon black was better compared with compositions comprising none of the above polymers or those comprising the liquid polyisoprene, unsaturated aliphatic acid ester or polyester having terminal carboxyl group. Table 2 shows that the rubber compositions of the present invention are also excellent in mechanical properties.

It is also understood that, with compositions comprising liquid polyisoprenes (II) or (III) having functional groups the positions of which cannot be restricted to one end of the molecule, these polyisoprenes exerted only insufficient effect of improving dispersibility of carbon black and, at the same time, reduction in Mooney viscosity was insufficient which means unsatisfactory processability.

Obviously, numerous modifications and variations of the present invention are possible in light of the above teachings. It is therefore to be understood that within the scope of the appended claims, the invention may be practiced otherwise than as specifically described herein.

TABLE 1

|  | Example | | | | | Comparative Example | | | | | | |
|---|---|---|---|---|---|---|---|---|---|---|---|---|
|  | 1 | 2 | 3 | 4 | 5 | 1 | 2 | 3 | 4 | 5 | 6 | 7 |
| NR (RSS#1) | 95 | 95 | 95 | 95 | — | 95 | 100 | — | 95 | 95 | 95 | 95 |
| SBR (1502) | — | — | — | — | 95 | — | — | 100 | — | — | — | — |
| Functional group-containing polymer | | | | | | | | | | | | |
| (I) | 5 | — | — | — | — | — | — | — | — | — | — | — |
| (II) | — | 5 | — | — | — | — | — | — | — | — | — | — |
| (III) | — | — | 5 | — | — | — | — | — | — | — | — | — |
| (IV) | — | — | — | 5 | — | — | — | — | — | — | — | — |
| (V) | — | — | — | — | 5 | — | — | — | — | — | — | — |
| Liquid polyisoprene (I) | — | — | — | — | — | 5 | — | — | — | — | — | — |
| Unsaturated aliphatic ester (I) | — | — | — | — | — | — | — | — | 5 | — | — | — |
| Terminal carboxyl group-containing polyester (I) | — | — | — | — | — | — | — | — | — | 5 | — | — |
| Liquid polyisoprene (II) | — | — | — | — | — | — | | | | | | |
| Liquid polyisoprene (III) | — | — | — | — | — | — | — | — | — | — | — | 5 |
| Carbon black (SAF) | 50 | 50 | 50 | 50 | 50 | 50 | 50 | 50 | 50 | 50 | 50 | 50 |
| ZnO#1 | 5 | 5 | 5 | 5 | 5 | 5 | 5 | 5 | 5 | 5 | 5 | 5 |
| Stearic acid | 2 | 2 | 2 | 2 | 2 | 2 | 2 | 2 | 2 | 2 | 2 | 2 |
| Sulfur | 2 | 2 | 2 | 2 | 2 | 2 | 2 | 2 | 2 | 2 | 2 | 2 |
| Accelerator | 1 | 1 | 1 | 1 | 1 | 1 | 1 | 1 | 1 | 1 | 1 | 1 |
| Antioxidant | 1 | 1 | 1 | 1 | 1 | 1 | 1 | 1 | 1 | 1 | 1 | 1 |
| Incorporation of carbon black | ⊙ | ⊙ | ○ | ⊙ | ○ | Δ | x | x | Δ | x | Δ | Δ |
| Mooney viscosity (ML1 + 4, 100° C.) | 66 | 68 | 66 | 63 | 56 | 70 | 84 | 65 | 61 | 70 | 80 | 80 |
| Dispersion state of carbon black | A-2 | A-2 | B-1 | A-1 | B-1 | C-3 | D-4 | D-3 | C-2 | D-4 | C-1 | C-1 |

TABLE 2

|  | Example | | | | | Comparative Example | | | | | | |
|---|---|---|---|---|---|---|---|---|---|---|---|---|
|  | 1 | 2 | 3 | 4 | 5 | 1 | 2 | 3 | 4 | 5 | 6 | 7 |
| M100 [kg/cm$^2$] | 51 | 53 | 55 | 57 | 61 | 47 | 46 | 52 | 44 | 39 | 56 | 57 |
| M300 [kg/cm$_2$] | 209 | 213 | 210 | 220 | 210 | 198 | 200 | 195 | 180 | 170 | 200 | 190 |
| TB [kg/cm$_3$] | 355 | 355 | 340 | 360 | 328 | 320 | 325 | 310 | 330 | 280 | 325 | 310 |
| EB [%] | 510 | 500 | 500 | 520 | 410 | 490 | 500 | 390 | 480 | 410 | 480 | 470 |
| HS [JIS A] | 76 | 77 | 76 | 77 | 75 | 75 | 74 | 73 | 74 | 73 | 75 | 76 |

TABLE 2-continued

| | Example | | | | | Comparative Example | | | | | | |
|---|---|---|---|---|---|---|---|---|---|---|---|---|
| | 1 | 2 | 3 | 4 | 5 | 1 | 2 | 3 | 4 | 5 | 6 | 7 |
| Akron wear test*[1] | 0.09 | 0.08 | 0.09 | 0.07 | 0.15 | 0.14 | 0.13 | 0.22 | 0.19 | 0.34 | 0.12 | 0.21 |

M100: tensile strength at 100% elongation
M300: tensile strength at 300% elongation
TB: tensile strength at break
EB: elongation at break
HS: hardness
Test method: JIS K301
*[1] cc/1000 rotations

What is claimed is:

1. A rubber composition comprising:
a terminal functional group-containing polymer having a number average molecular weight of 1,000 to 100,000 and comprising 0 to 60 mole % of a structural unit represented by the formula (1) and 100 to 40 mole % of a structural unit represented by formula (2) plus a structural unit represented by formula (3), said polymer having on one end of its molecule an average of from 0.6 to 1.0 group per molecule of a group represented by formula (4), a hydroxyl group or an amino group;

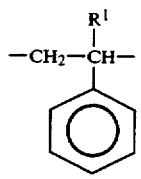

(1)

wherein $R^1$ represents a hydrogen atom or a methyl group,

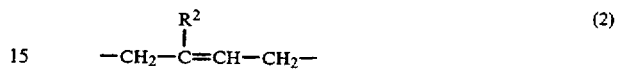

(2)

wherein $R^2$ represents a hydrogen atom or a methyl group,

(3)

wherein $R^3$ represents a vinyl group or an isopropenyl group;

$$-COOR^4 \quad (4)$$

wherein $R^4$ represents a hydrogen atom or an alkali metal;
a solid rubber; and
carbon black selected from the group consisting of HAF, ISAF, and SAF carbon blacks.

2. A rubber composition according to claim 1, wherein said functional group-containing polymer is contained in an amount of 1 to 40% by weight based on the sum of the weights of said functional group-containing polymer and said solid rubber.

3. A rubber composition according to claim 1, wherein said solid rubber is natural rubber (NR), isoprene rubber (IR), butadiene rubber (BR), styrene-butadiene rubber (SBR) or ethylene-propylene-diene rubber (EPDM).

* * * * *